United States Patent
Mihara et al.

(10) Patent No.: US 8,917,348 B2
(45) Date of Patent: Dec. 23, 2014

(54) SOLID-STATE IMAGING DEVICE, CAMERA MODULE, AND ILLUMINANCE DETECTION METHOD

(75) Inventors: Naoto Mihara, Kanagawa (JP); Teppei Nakano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 13/557,548

(22) Filed: Jul. 25, 2012

(65) Prior Publication Data

US 2013/0093930 A1    Apr. 18, 2013

(30) Foreign Application Priority Data

Oct. 12, 2011    (JP) .................................. 2011-224959

(51) Int. Cl.
*H04N 5/235*    (2006.01)
*G03B 7/00*    (2014.01)
*H04N 5/228*    (2006.01)

(52) U.S. Cl.
CPC ............ *H04N 5/2351* (2013.01); *H04N 5/2353* (2013.01)
USPC ....................................... 348/362; 348/222.1

(58) Field of Classification Search
USPC ......... 348/216.1, 333.01, 333.12, 222.1, 362, 348/364, 366
See application file for complete search history.

(56) References Cited

U.S. PATENT DOCUMENTS

2009/0303346 A1*    12/2009    Kanemitsu et al. ......... 348/229.1
2011/0199527 A1*    8/2011    Ichikawa ................. 348/333.01

FOREIGN PATENT DOCUMENTS

| JP | 2001-16507 | 1/2001 |
| JP | 2001-281054 | 10/2001 |
| JP | 2007-251343 | 9/2007 |
| JP | 2010-135921 | 6/2010 |

* cited by examiner

*Primary Examiner* — Kelly L Jerabek
(74) *Attorney, Agent, or Firm* — Oblon, Spivak, McClelland, Maier & Neudstadt, L.L.P.

(57) ABSTRACT

According to one embodiment, a solid-state imaging device includes a luminance integrating unit, a luminance observation value calculating unit, and an illuminance value conversion unit. The luminance integrating unit integrates a luminance value detected for every pixel. The luminance observation value calculating unit calculates a luminance observation value based on an integration result in the luminance integrating unit. The luminance observation value is an observation result of the luminance for an entire imaging screen. The illuminance value conversion unit converts the luminance observation value to an illuminance value. The luminance integrating unit integrates the luminance value discriminated in accordance with a condition set with respect to a luminance level.

19 Claims, 8 Drawing Sheets

| G | R | G | R |
|---|---|---|---|
| B | G | B | G |
| G | R | G | R |
| B | G | B | G |

FIG.13

| Ye | Cy | Ye | Cy |
|----|----|----|----|
| Mg | G  | Mg | G  |
| Ye | Cy | Ye | Cy |
| Mg | G  | Mg | G  |

FIG.14

| Wh | Ye | Wh | Ye |
|----|----|----|----|
| Cy | Wh | Cy | Wh |
| Wh | Ye | Wh | Ye |
| Cy | Wh | Cy | Wh |

SOLID-STATE IMAGING DEVICE, CAMERA MODULE, AND ILLUMINANCE DETECTION METHOD

CROSS-REFERENCE TO RELATED APPLICATIONS

This application is based upon and claims the benefit of priority from Japanese Patent Application No. 2011-224959, filed on Oct. 12, 2011; the entire contents of all of which are incorporated herein by reference.

FIELD

Embodiments described herein relate generally to a solid-state imaging device, a camera module, and an illuminance detection method.

BACKGROUND

A technique of detecting illuminance using a solid-state imaging element such as a CMOS image sensor has been conventionally proposed. For instance, a camera module can adjust the brightness of a display screen in accordance with the detected illuminance. A method of adding up a luminance value detected at each pixel and taking an average of the luminance values in an entire imaging screen as an illuminance value is known for the method of detecting the illuminance by the solid-state imaging element.

When using the luminance value of the entire imaging screen, luminance data, which is considered a disadvantage in the calculation of the illuminance value, may be contained. For instance, if a subject having low reflectivity such as a shaded portion or a black subject is contained in great amount in the imaging screen, the reflected light to be received by the solid-state imaging element reduces and the illuminance value lower than the actual value may be calculated. If a direct light from a light source such as a spot light is entered, the illuminance value higher than the actual value may be calculated. Furthermore, the illuminance value lower than the actual value is sometimes calculated if saturation of the output with respect to the incident light quantity occurs in the solid-state imaging element.

BRIEF DESCRIPTION OF THE DRAWINGS

FIG. 13 is a view describing a configuration example of a complementary color filter; and FIG. 14 is a view describing a variant of the configuration of the complementary color filter.

DETAILED DESCRIPTION

In general, according to one embodiment, a solid-state imaging device includes an image sensor, a luminance integrating unit, a luminance observation value calculating unit, and an illuminance value conversion unit. The image sensor picks up a subject image. The luminance integrating unit integrates a luminance value detected for every pixel in the image sensor. The luminance observation value calculating unit calculates a luminance observation value based on the integration result of the luminance integrating unit. The luminance observation value is the observation result of the luminance for an entire imaging screen. The illuminance value conversion unit converts the luminance observation value from the luminance observation value calculating unit to an illuminance value. The luminance integrating unit integrates the luminance value discriminated in accordance with a condition set with respect to a luminance level of the luminance values detected in the image sensor.

Exemplary embodiments of a solid-state imaging device, a camera module, and an illuminance detection method will be explained below in detail with reference to the accompanying drawings. The present invention is not limited to the following embodiments.

Figure 1:
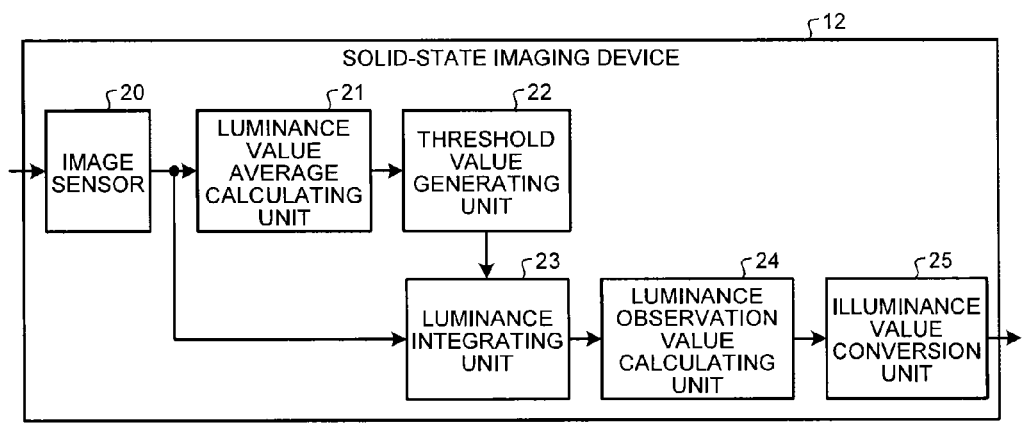
FIG. 1 is a block diagram showing a configuration for calculating an illuminance value in a solid-state imaging device according to a first embodiment.
Figure 2:
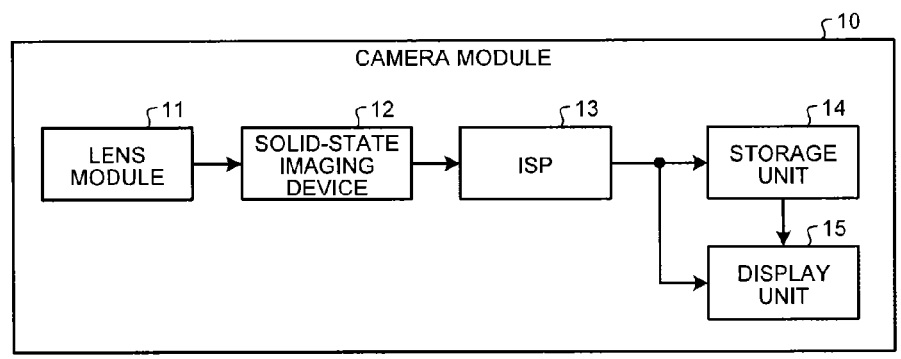
FIG. 2 is a block diagram showing a schematic configuration of a camera module including the solid-state imaging device shown in FIG. 1.

FIG. 1 is a block diagram showing a configuration for calculating an illuminance value in a solid-state imaging device according to a first embodiment. FIG. 2 is a block diagram showing a schematic configuration of a camera module including the solid-state imaging device shown in FIG. 1. A camera module 10 is, for example, a digital camera. The camera module 10 may be an electronic device other than the digital camera such as a portable terminal with a camera.

The camera module 10 includes a lens module 11, a solid-state imaging device 12, an image signal processor (ISP) 13, a storage unit 14, and a display unit 15. The lens module 11 retrieves light from a subject and forms a subject image. The solid-state imaging device 12 picks up the subject image.

The ISP 13 performs signal processing of an image signal obtained by the imaging of the solid-state imaging device 12. The storage unit 14 stores images subjected to the signal processing in the ISP 13. The storage unit 14 outputs an image signal to the display unit 15 in accordance with an operation of the user, or the like. The display unit 15 displays images in accordance with an image signal input from the ISP 13 or the storage unit 14. The display unit 15 is, for example, a liquid crystal display.

The solid-state imaging device 12 includes an image sensor 20, a luminance value average calculating unit 21, a threshold value generating unit 22, a luminance integrating unit 23, a luminance observation value calculating unit 24, and an illuminance value conversion unit 25. The image sensor 20 includes each color light pixel for detecting each color light in a divided manner. The image sensor 20 detects the luminance value for every pixel through photoelectric conversion of the light from the subject.

The luminance value average calculating unit 21 calculates an average of the luminance values detected for every pixel in the image sensor 20. The luminance value average calculating unit 21, for example, integrates the luminance value acquired in the image sensor 20 for all the pixels to obtain an average value. The luminance value average calculating unit 21 may integrate the luminance values for some pixels other than integrating the luminance values for all the pixels in the imaging screen. The luminance value average calculating unit 21 may integrate the luminance values for pixels positioned at a predetermined interval, for example.

The threshold value generating unit 22 generates a threshold value for a luminance level based on the average value calculated by the luminance value average calculating unit 21. The threshold value generating unit 22 defines a level of the luminance value to be integrated for the calculation of the illuminance value by the setting of the threshold value. A case of setting the threshold value using the average value of the luminance values is described herein by way of example, but the threshold value generating unit 22 may set the threshold value based on elements other than the average value of the luminance values. A specific example of the setting of the threshold value in the threshold value generating unit 22 will be described later.

The luminance integrating unit 23 extracts the luminance value in a desired luminance level range by comparison between the luminance value detected in the image sensor 20 and the threshold value set in the threshold value generating unit 22. The luminance integrating unit 23 integrates the luminance value discriminated through comparison with the threshold value.

The luminance integrating unit 23 may perform the discrimination of the luminance value through the comparison with the threshold value on some pixels other than performing it on all the pixels in the imaging screen. The luminance integrating unit 23 may, for example, discriminate the luminance value with pixels positioned at a predetermined interval as a target.

Other than excluding from the integrating target, the luminance integrating unit 23 may replace the luminance value determined as outside the range of the threshold value with a predetermined value to include in the integrating target. The luminance integrating unit 23 may replace the luminance value outside the range of the threshold value with the relevant threshold value, for example, to integrate such luminance value.

The luminance observation value calculating unit 24 calculates a luminance observation value, which is the observation result of the luminance for the entire imaging screen, based on the integration result of the luminance integrating unit 23. The illuminance value conversion unit 25 converts the luminance observation value from the luminance observation value calculating unit 24 to the illuminance value. The solid-state imaging device 12 outputs the illuminance value obtained by the illuminance value conversion unit 25.

The illuminance value conversion unit 25 may convert the luminance observation value to the illuminance value through any method. For instance, the illuminance value conversion unit 25 may have a value obtained by multiplying a preset coefficient to the luminance observation value as the illuminance value. The illuminance value conversion unit 25 may have, for example, a value obtained by adding or subtracting a predetermined offset value to or from the luminance observation value as the illuminance value.

The camera module 10 adjusts the brightness of the display unit 15 (see FIG. 2) according to the illuminance value obtained by the solid-state imaging device 12 at the time of imaging, for example. The camera module 10 enhances the brightness of the display unit 15 the higher the illuminance value obtained by the solid-state imaging device 12. The camera module 10 can display a screen that is easy to see under any illuminance environment by appropriately adjusting the brightness of the display unit 15 according to the surrounding illuminance at the time of the imaging.

The camera module 10 may use the illuminance value obtained by the solid-state imaging device 12 to any application other than the adjustment of the brightness of the display unit 15. The method of converting from the luminance observation value to the illuminance value in the illuminance value conversion unit 25 can be appropriately set according to the usage application of the illuminance value. The solid-state imaging device 12 may output the luminance observation value obtained by the luminance observation value calculating unit 24 as is as the illuminance value.

The generation of the threshold value in the threshold value generating unit 22 will now be described. The threshold value generating unit 22 generates an upper threshold value and a lower threshold value for the threshold value. The threshold value generating unit 22, for example, generates the upper threshold value and the lower threshold value by multiplying a preset coefficient to the average value calculated by the luminance value average calculating unit 21.

The upper threshold value is set as a condition for excluding the luminance data obtained by the direct light from the light source such as a spot light from the luminance data to be used in the calculation of the illuminance value. The lower threshold value is set as a condition for excluding the luminance data obtained by imaging the subject with low reflectivity from the luminance data to be used in the calculation of the illuminance value.

Figure 3:
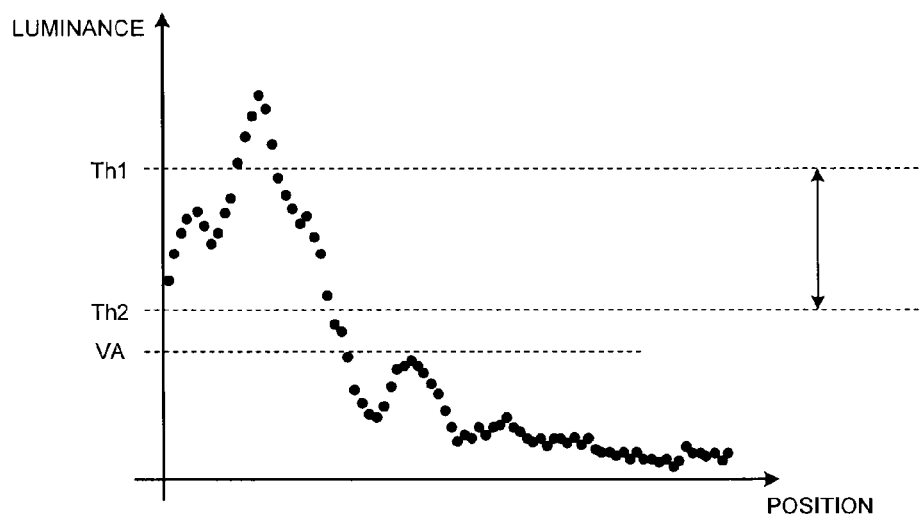
FIG. 3 is a view showing an example of discriminating a luminance value based on an upper threshold value and a lower threshold value in a luminance integrating unit.

FIG. 3 is a view showing an example of discriminating the luminance value based on the upper threshold value and the lower threshold value in the luminance integrating unit. A vertical axis in the illustrated graph represents the level of the luminance value. A horizontal axis in the graph represents the position of the pixel when the luminance value for every pixel on the imaging screen is read out as one-dimensional information.

The threshold value generating unit 22 generates an upper threshold value Th1 and a lower threshold value Th2 (Th1>Th2) by multiplying a predetermined coefficient on an average value VA of the luminance values, for example. The luminance integrating unit 23 extracts the luminance value within a luminance level range from Th2 to Th1 of the luminance values detected in the image sensor 20 as the integrating target. The threshold value generating unit 22 may generate the Th1 and the Th2 by adding or subtracting a predetermined offset value to or from the VA. The threshold value generating unit 22 may generate the Th1 and the Th2 through any calculation using the VA.

Other than excluding from the integrating target, the luminance integrating unit 23 may replace a luminance value determined as outside the luminance level range from Th2 to Th1 with a predetermined value to include in the integrating target. The luminance integrating unit 23 may replace the luminance value greater than Th1 with Th1, for example, to integrate such value. The luminance integrating unit 23 may replace the luminance value smaller than Th2 with Th2, for example, to integrate such value.

The reflectivity of the subject is relatively low in most cases as the standard reflectivity, which is an average value when the reflectivity of the subject is obtained for various articles, is known to be 18%. Thus, the luminance integrating unit 23 can extract the luminance data obtained by the subject of high reflectivity suited for the calculation of the illuminance by setting a value higher than the VA as the Th2. In this case, the threshold value generating unit 22 sets a value greater than the VA for the Th2, but this is not the sole case. Th2 may be a value smaller than the VA.

According to the present embodiment, the solid-state imaging device 12 can realize a highly accurate illuminance detection by excluding the luminance data obtained by the subject of low reflectivity and the luminance data obtained by the direct light.

The threshold value generating unit 22 is not limited to generating the threshold value corresponding to the average value from the luminance value average calculating unit 21. The threshold value generating unit 22 may generate the threshold value without using the average value from the luminance value average calculating unit 21. The solid-state imaging device 12 may include an element other than the luminance value average calculating unit 21 as a configuration for processing the luminance value from the image sensor 20. The configuration for processing the luminance value may be appropriately changed according to the method of generating the threshold value.

The threshold value generating unit 22 may generate the threshold value based on a value other than the average value, for example, a maximum value and a minimum value, a value obtained from a distribution (histogram) of the luminance values, or the like for the luminance value detected in the image sensor 20. The threshold value generating unit 22 may perform multiplication of the coefficient, addition or subtraction of the offset value, and the like when generating the threshold value based on the above values.

Figure 4:
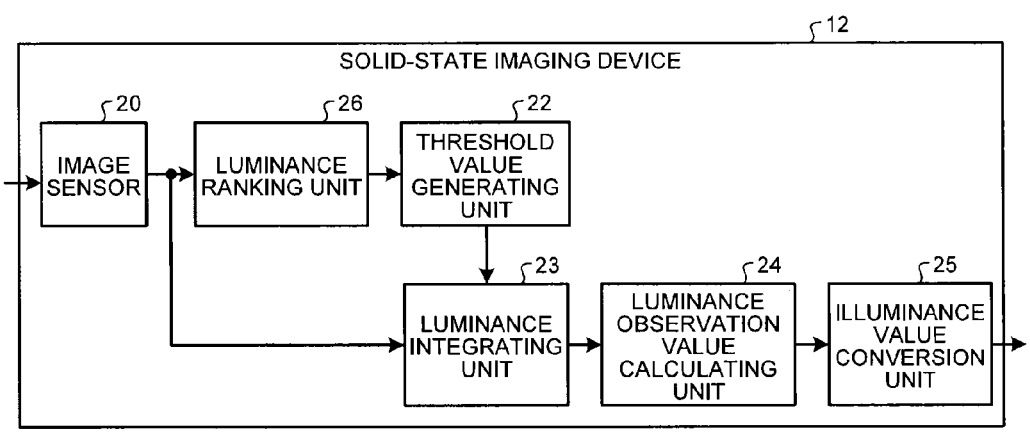
FIG. 4 is a block diagram showing a configuration example of when determining the threshold value based on the result of ranking the luminance value.

The threshold value generating unit 22 may determine the threshold value based on a result in which the luminance value of each pixel is ranked in the order of the luminance level. FIG. 4 is a block diagram showing a configuration example of when determining the threshold value based on the result of ranking the luminance value. A luminance ranking unit 26 gives a rank corresponding to the luminance level to the luminance value detected in the image sensor 20. The threshold value generating unit 22 determines the threshold value based on the rank given in the luminance ranking unit 26.

Figure 5:
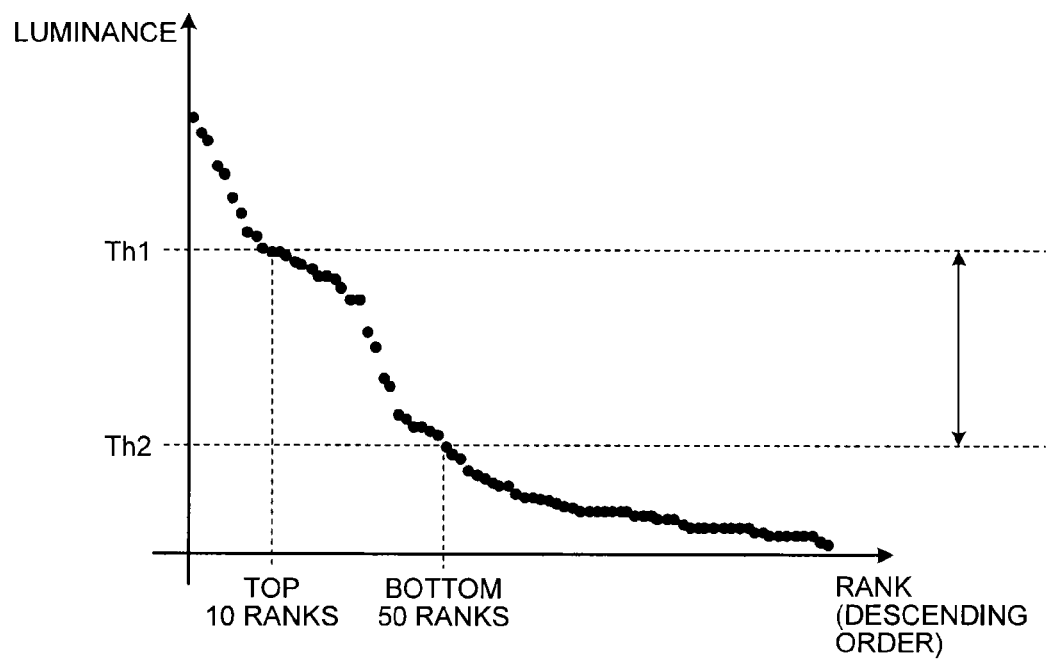
FIG. 5 is a view showing an example of discriminating the luminance value based on the ranking of the luminance value.

FIG. 5 is a view showing an example of discriminating the luminance value based on the ranking of the luminance value. A vertical axis in the illustrated graph represents the level of the luminance value. A horizontal axis in the graph represents the ranking given in the luminance ranking unit 26 in descending order. The luminance ranking unit 26 gives rank so that the rank is higher, the higher the luminance level.

The threshold value generating unit 22 assumes, for example, the tenth luminance value from the top of the luminance value of each pixel as the upper threshold value Th1. The Th1 is a luminance value which rank given in the luminance ranking unit 26 is the first set rank.

The threshold value generating unit 22 assumes, for example, the fiftieth luminance value from the bottom of the luminance value of each pixel as the lower threshold value Th2. The Th2 is the luminance value which rank given in the luminance ranking unit 26 is the second set rank lower than the first set rank. The first and second set ranks are preset, for example.

When discriminating the luminance value based on the ranking of the luminance value, the amount of data of the luminance value used in the integration of the luminance integrating unit 23 is constant and can be grasped in advance. Thus, the luminance integrating unit 23 can efficiently drive the circuit of an appropriate scale to perform the integrating process.

The threshold value generating unit 22 is not limited to the case of generating the threshold value using the luminance value detected in the image sensor 20. The threshold value generating unit 22 may output a threshold value set from outside, for example. The threshold value generating unit 22 may specify the value that can be determined as direct light from the histogram as the upper threshold value for excluding the luminance data by the direct light from the light source such as a spot light. The threshold value generating unit 22 may define the luminance level that can be specified as the direct light in advance, and set the same as the upper threshold value.

The threshold value generating unit 22 is not limited to generating the upper threshold value and the lower threshold value through a similar method, and may generate the upper threshold value and the lower threshold value through methods different from each other. For instance, the threshold value generating unit 22 may have the value set from outside as the upper threshold value, and the value subjected through the process from the luminance value detected by the image sensor 20 as the lower threshold value.

The threshold value generating unit 22 may adjust the level of at least one of the upper threshold value and the lower threshold value according to the bright and dark tendency of the entire imaging screen. For instance, if determined that the entire imaging screen is dark, the threshold value generating unit 22 may obtain a great number of data of high luminance level by having the upper threshold value as a value higher than normal. The solid-state imaging device 12 can enable highly accurate illuminance detection corresponding to the bright and dark of the subject image.

The threshold value generating unit 22 is not limited to generating both the upper threshold value and the lower threshold value, and may generate at least one of either the upper threshold value or the lower threshold value. The threshold value generating unit 22, for example, may omit either the upper threshold value or the lower threshold value according to the illuminance environment or the like assumed in the imaging by the camera module 10. For instance, when assuming imaging under an environment not including the light source, the threshold value generating unit 22 may set the lower threshold value and omit the setting of the upper threshold value.

If the luminance data in the range of the threshold value generated by the threshold value generating unit 22 does not exist or is extremely few, the solid-state imaging device 12 may, for example, integrate all the luminance values detected in the image sensor 20 in the luminance integrating unit 23. Alternatively, the solid-state imaging device 12 may stop the processing for detecting the illuminance. When stopping the processing for detecting the illuminance because the luminance data effective for the calculation of the illuminance does not exist or is extremely few, the camera module 10 may notify this through display of the display unit 15 or the like.

Figure 6:
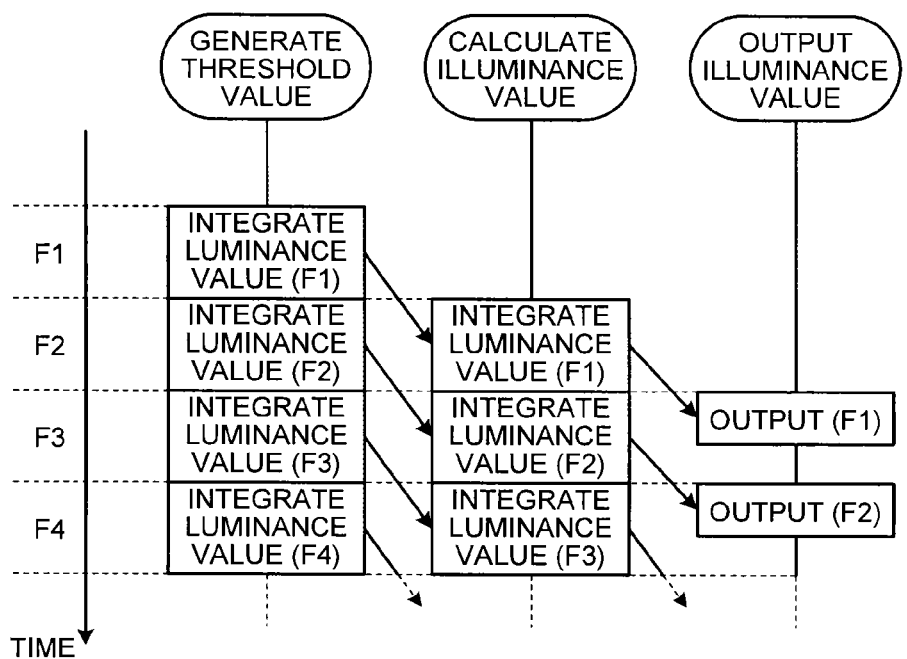
FIG. 6 is a conceptual diagram describing an example of each timing of integration for generating the threshold value, integration for calculating the illuminance value, and an output of the illuminance value.

FIG. 6 is a conceptual diagram describing an example of each timing of integration for generating the threshold value, integration for calculating the illuminance value, and output of the illuminance value. Here, a case of generating the threshold value from the average of the luminance values acquired by the image sensor 20 and obtaining the illuminance value will be described by way of example.

The luminance value average calculating unit 21, for example, integrates the luminance value acquired by the image sensor 20 during a period of a certain frame F1. The luminance value average calculating unit 21 calculates the average of the luminance values after finishing the integration of the luminance value for F1. The threshold value generating unit 22 generates the threshold value based on the average value of the luminance values.

After the threshold value is generated by the threshold value generating unit 22 for F1, the luminance integrating unit 23 integrates the luminance values for F1 during a period of the next frame F2. After the integration of the luminance values for F1 is finished, the solid-state imaging device 12 performs the calculation of the luminance observation value in the luminance observation value calculating unit 24, and the conversion to the illuminance value in the illuminance value conversion unit 25, and outputs the illuminance value at the start of the next frame F3. The solid-state imaging device 12 performs similar processes for each frame F2, F3, and F4 following the frame F1 and outputs the illuminance values.

Thus, the solid-state imaging device 12 outputs the illuminance value after two frame periods of the integration for generating the threshold value and the integration for calculating the illuminance value. The camera module 10 acquires the illuminance value from the luminance data of two frame periods before. As the change in luminance data is relatively small if for about two frame periods, the camera module 10 can realize the control system of brightness adjustment and the like of the display unit 15 using the illuminance value acquired by the present embodiment.

The solid-state imaging device 12 may include a frame memory for storing the luminance data. For instance, the solid-state imaging device 12 may use the luminance data read out from the frame memory in the integration for calculating the illuminance value.

Figure 7:
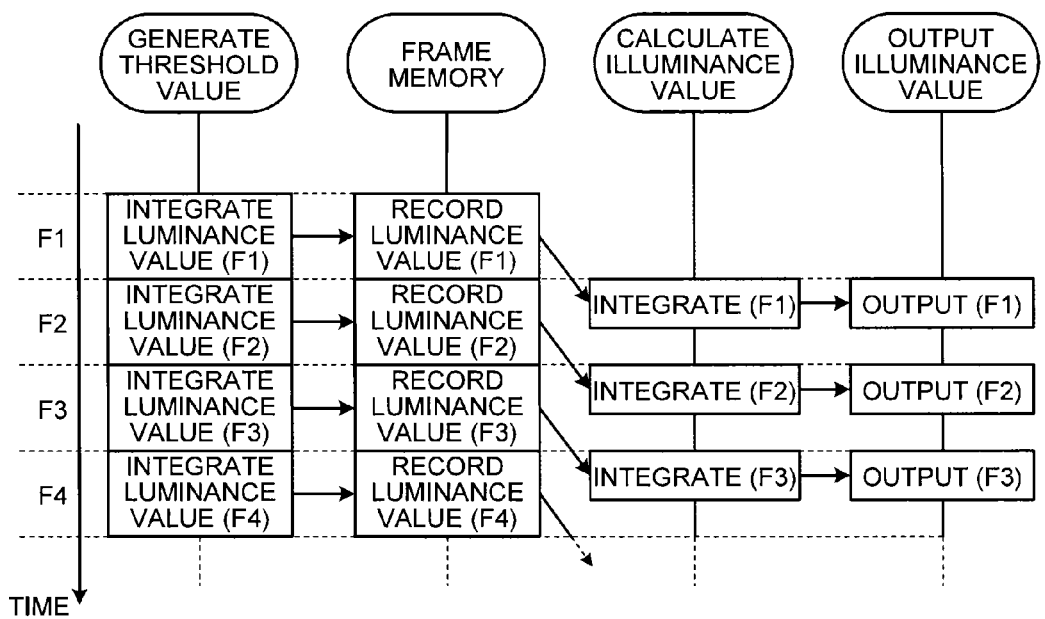
FIG. 7 is a conceptual diagram describing an example of each timing of integration for generating the threshold value, recording to the frame memory, integration for calculating the illuminance value, and output of the illuminance value.

FIG. 7 is a conceptual diagram describing an example of each timing of integration for generating the threshold value, recording to the frame memory, integration for calculating the illuminance value, and output of the illuminance value. The frame memory records the luminance value for F1 while the luminance value average calculating unit 21 integrates the luminance values for a certain frame F1.

The luminance integrating unit 23 collectively carries out the readout and the integration of the luminance data recorded in the frame memory for the F1 at the same time as the end of the F1 period. Furthermore, the solid-state imaging device 12 carries out the calculation of the luminance observation value in the luminance observation value calculating unit 24, and the conversion to the illuminance value in the illuminance value conversion unit 25, and outputs the illuminance value at the start of the next frame F2. The solid-state imaging device 12 performs similar processes for each frame F2, F3, and F4 following the frame F1 and outputs the illuminance values.

In this case, the solid-state imaging device 12 can shorten the period from the detection of the luminance data to the output of the illuminance value to one frame period. The camera module 10 can realize the control system using the illuminance value obtained in a small as possible time difference from when the luminance data is detected.

Figure 8:
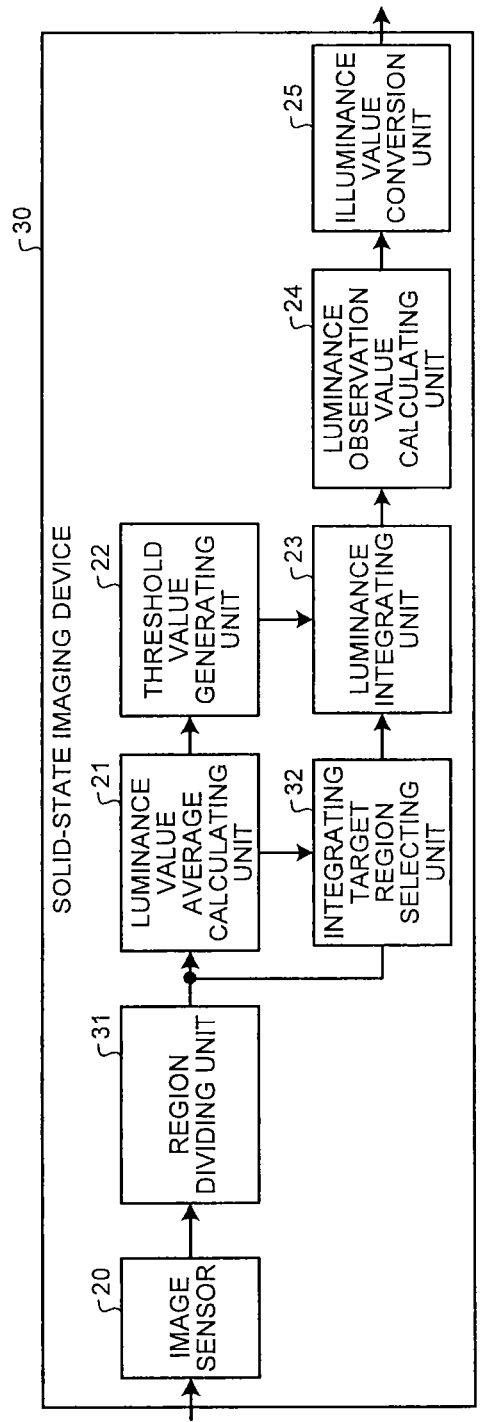
FIG. 8 is a block diagram showing a configuration for calculating the illuminance value in a solid-state imaging device according to a second embodiment.

FIG. 8 is a block diagram showing a configuration for calculating the illuminance value in the solid-state imaging device according to the second embodiment. The portions same as the first embodiment are denoted with the same reference numerals, and the redundant description will be appropriately omitted.

A solid-state imaging device 30 includes the image sensor 20, a region dividing unit 31, the luminance value average calculating unit 21, the threshold value generating unit 22, an integrating target region selecting unit 32, the luminance integrating unit 23, the luminance observation value calculating unit 24, and the illuminance value conversion unit 25. The region dividing unit 31 divides the imaging screen into a plurality of regions, where the luminance value detected in the image sensor 20 becomes the data for every region.

The luminance value average calculating unit 21 calculates the average of the luminance value for every region. The luminance value average calculating unit 21, for example, integrates the luminance value for all the pixels in the region, and obtains the average value. The luminance value average calculating unit 21 may integrate the luminance values for some pixels in the region other than integrating the luminance values for all the pixels for every region. The luminance value average calculating unit 21 may, for example, integrate the luminance value for pixels positioned at a predetermined interval in the region.

The threshold value generating unit 22 generates the threshold value for every region based on the average value calculated in the luminance value average calculating unit 21. The threshold value generating unit 22 may set the threshold value based on an element other than the average value of the luminance values, similar to the first embodiment, other than setting the threshold value using the average value of the luminance values. The threshold value generating unit 22 may generate the threshold value common for all regions, for example, other than generating the threshold value for every region.

The integrating target region selecting unit 32 selects an integrating target region where the luminance value is to be the target of integration in the luminance integrating unit 23 from a plurality of regions set in the imaging screen. The integrating target region selecting unit 32, for example, may rank the average value obtained for every region according to the luminance level, and select the integrating target region according to the rank.

The integrating target region selecting unit 32 selects the region second from the top or the top four regions as the integrating target region, for example. The integrating target region selecting unit 32 may receive a specification of the integrating target region from outside, other than selecting the integrating target region according to the preset condition.

The luminance integrating unit 23 compares the luminance value for every pixel and the threshold value obtained for the relevant region with respect to the region selected as the integrating target region in the integrating target region selecting unit 32. The luminance integrating unit 23 integrates the luminance value discriminated through comparison with the threshold value.

The luminance integrating unit 23 may perform the discrimination of the luminance values through the comparison with the threshold value for some pixels in the region other than performing the discrimination for all the pixels in the region. For instance, the luminance integrating unit 23 may discriminate the luminance value with the pixels positioned at a predetermined interval in the region as the target.

The luminance integrating unit 23 may replace the luminance value determined as outside the range of the threshold value with a predetermined value to include as the integrating target, other than excluding it from the integrating target. The luminance integrating unit 23 may replace the luminance value outside the range of the threshold value with the threshold value, for example, and integrate such value.

The luminance observation value calculating unit 24 calculates the luminance observation value, which is the observation result of the luminance for the entire imaging screen based on the integration result in the luminance integrating unit 23. The illuminance value conversion unit 25 converts the luminance observation value from the luminance observation value calculating unit 24 to the illuminance value. The solid-state imaging device 30 outputs the illuminance value obtained by the illuminance value conversion unit 25. The illuminance value conversion unit 25 may convert the luminance observation value to the illuminance value through any method, similar to the first embodiment. The illuminance value conversion unit 25 may calculate the illuminance value for every region other than calculating one illuminance value for the entire imaging screen.

Figure 9:
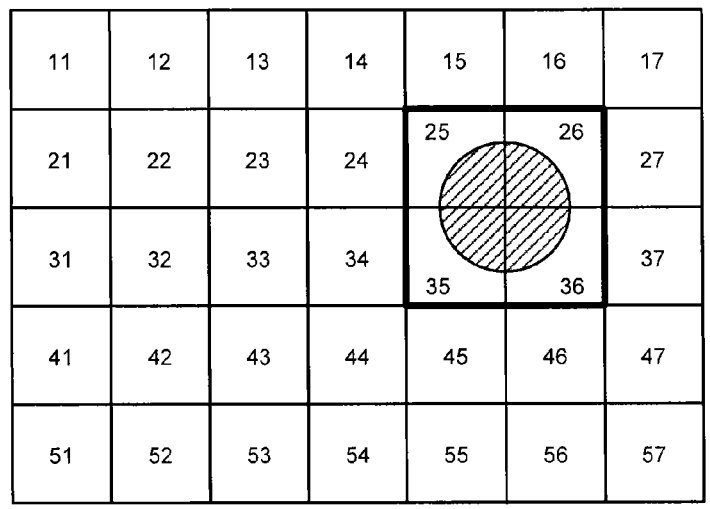
FIG. 9 is a view describing an example of a selection of an integrating target region by an integrating target region selecting unit.

The integrating target region selecting unit 32 may select the integrating target region based on the result of counting the number of data of the luminance value determined as within the range of the threshold value in the luminance integrating unit 23 for every region. FIG. 9 is a view describing an example of the selection of the integrating target region by the integrating target region selecting unit. A case in which the region dividing unit 31 divides the imaging screen into 35 regions ("11" to "57") will be described by way of example.

For instance, assume the direct light entered from the light source enters a circular region crossing over four regions "25", "26", "35", and "36", as shown with a shaded line in the figure, and the luminance value in the circular region is outside the range of the threshold value in each region. If the number of data of the luminance value within the range of the threshold value is smaller than the number set in advance in each region, the integrating target region selecting unit 32 excludes each region of "25", "26", "35", and "36" from the integrating target region in the next calculation of the illuminance value.

According to the second embodiment, the solid-state imaging device 30 enables the luminance data to use in the illuminance calculation to be discriminated in accordance with the condition set as divided into a plurality of regions, so that a highly accurate illuminance detection corresponding to the state for every portion in the imaging screen can be carried out.

Figure 10:
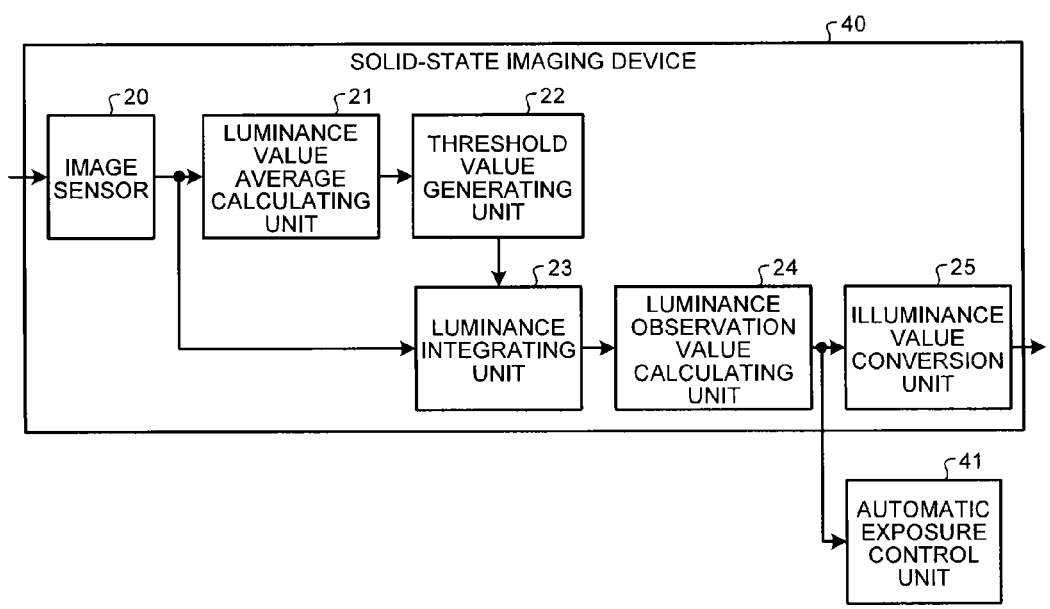
FIG. 10 is a block diagram showing a solid-state imaging device and an automatic exposure control unit according to a third embodiment.

FIG. 10 is a block diagram showing a solid-state imaging device and an automatic exposure control unit according to a third embodiment. A solid-state imaging device 40 of the present embodiment, for example, has a configuration similar to the solid-state imaging device 12 shown in FIG. 1. The same reference numerals are denoted on the same portions as the first embodiment, and the redundant description will be appropriately omitted. The solid-state imaging device 40 may have a configuration similar to any one of the solid-state imaging devices shown in the first and second embodiments.

An automatic exposure control unit 41 adjusts the exposure in the imaging of the subject image in accordance with the luminance observation value calculated by the luminance observation value calculating unit 24. According to the third embodiment, the camera module 10 can perform a highly accurate exposure adjustment by using the luminance observation value calculated excluding the luminance data by the subject of low reflectivity and the luminance data by the direct light in the exposure adjustment.

In the third embodiment, the automatic exposure control unit 41 is arranged exterior to the solid-state imaging device 40 of the camera module 10. The automatic exposure control unit 41 may be arranged inside the solid-state imaging device 40.

Figures 11, 12:
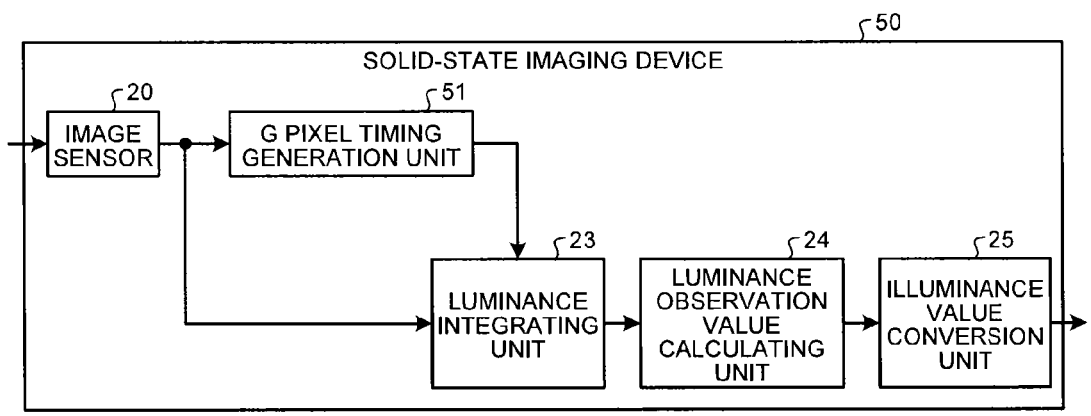
FIG. 11 is a block diagram showing a configuration for calculating an illuminance value in a solid-state imaging device according to a fourth embodiment.
FIG. 12 is a view describing a configuration example of a primary color filter.

FIG. 11 is a block diagram showing a configuration for calculating the illuminance value in a solid-state imaging device according to a fourth embodiment. The same reference numerals are denoted on the same portions as the first embodiment, and the redundant description will be appropriately omitted.

The image sensor 20, for example, includes a primary color filter. The primary color filter passes the primary color components of the light from the subject. An R pixel is a pixel in which a color filter for selectively transmitting a red light is arranged. A G pixel is a pixel in which a color filter for selectively transmitting a green light is arranged. A B pixel is a pixel in which a color filter for selectively transmitting a blue light is arranged.

A G pixel timing generation unit 51 generates a pulse signal indicating a timing at which a luminance value of the G pixel is output from the image sensor 20. The luminance integrating unit 23 extracts the luminance value of the G pixel of the luminance values from the image sensor 20 according to the pulse signal from the G pixel timing generation unit 51. The luminance integrating unit 23 discriminates the luminance value of the green light detected at the G pixel, and integrates the same.

The luminance observation value calculating unit 24 calculates the luminance observation value, which is the observation result of the luminance for the entire imaging screen, based on the integration result in the luminance integrating unit 23. The illuminance value conversion unit 25 converts the luminance observation value from the luminance observation value calculating unit 24 to the illuminance value. A solid-state imaging device 50 outputs the illuminance value obtained by the illuminance value conversion unit 25. The illuminance value conversion unit 25 may convert the luminance observation value to the illuminance value through any method, similar to the first embodiment.

FIG. 12 is a view describing a configuration example of the primary color filter. The primary color filter has each filter for R, for G, and for B arranged in parallel in correspondence with the Bayer array configured with four pixels of G, R, B, and G as a unit. In the Bayer array, the G pixel is arranged at a ratio of two times the R pixel and the B pixel.

A spectral sensitivity of a human eye has a peak around the green located in the intermediate region of the wavelength region of the visible light. The image sensor 20 enhances the apparent resolution by enhancing the resolution of green. The solid-state imaging device 50 obtains the most information on the luminance for the G component of each component of R, G, B, and thus the luminance value from the G pixel is adopted for the integration of the luminance value for detecting the illuminance. The solid-state imaging device 50 discriminates the luminance value with a color component set in advance assuming great amount of information will be obtained with respect to the luminance as a condition.

According to the fourth embodiment, the solid-state imaging device 50 can simplify the circuit configuration compared to when using the luminance data for all the color lights by limiting the luminance data to use for the illuminance calculation to a specific color light. Furthermore, the solid-state imaging device 50 enables a highly accurate illuminance detection by adopting the luminance value from the G pixel for the luminance data to use for the illuminance calculation.

The solid-state imaging device 50 may not adjust the difference in the luminance level that occurs with the other color component according to the difference in the wavelength properties of the color filter since the integrating target in the luminance integrating unit 23 is limited to the G component. The solid-state imaging device 50 may omit the white balance adjustment for each component of R, G, and B in the calculation of the illuminance value.

The image sensor 20 may include a complementary color filter in place of the primary color filter. The complementary color filter passes the complementary color component of the light from the subject. FIG. 13 is a view describing a configuration example of the complementary color filter. The complementary color filter has each filter for Ye, for Cy, for Mg, and for G arranged in parallel in correspondence with a pixel array configured with four pixels of yellow (Ye), cyan (Cy), magenta (Mg), and green (G) as a unit.

The Ye filter corresponding to the Ye pixel selectively transmits the Ye light. The Cy filter corresponding to the Cy pixel selectively transmits the Cy light. The Mg filter corresponding to the Mg pixel selectively transmits the Mg light. The G filter corresponding to the G pixel selectively transmits the G light.

When applying the complementary color filter to the image sensor 20 as well, the luminance integrating unit 23 discriminates the luminance value of the green light detected at the G pixel, and integrates the same. In this case as well, the solid-state imaging device 50 can simplify the circuit configuration and enable a highly accurate illuminance detection.

FIG. 14 is a view describing a variant of the configuration of the complementary color filter. The complementary color filter according to the variant includes each filter for Ye and for Cy, and a white (Wh) filter. The complementary color filter is corresponded to a pixel array configured with four pixels of Wh, Ye, Cy, Wh as a unit. The Wh filter transmits the Wh light. The Wh light contains each component of R, G, and B.

When applying such complementary color filter to the image sensor 20, the luminance integrating unit 23 discriminates the luminance value of the white light detected at the Wh pixel, and integrates the same. The solid-state imaging device 50 enables a highly accurate illuminance detection by adopting the Wh component in which the information for the luminance is obtained the most of each component of Wh, Ye, Cy for the luminance data used in the illuminance calculation.

The solid-state imaging device 50 may use the luminance observation value calculated by the luminance observation value calculating unit 24 in the exposure adjustment in the automatic exposure control unit 41 (see FIG. 10), similar to the third embodiment. The camera module 10 can calculate the luminance observation value from the luminance value of a color component specified assuming great amount of information for the luminance will be obtained, and use the same in the exposure adjustment to perform a highly accurate exposure adjustment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
an image sensor configured to pick up a subject image;
a luminance integrating unit configured to integrate a luminance value detected for every pixel in the image sensor;
a luminance observation value calculating unit configured to calculate a luminance observation value, which is an observation result of a luminance for an entire imaging screen, based on an integration result of the luminance integrating unit;
an illuminance value conversion unit configured to convert the luminance observation value from the luminance observation value calculating unit to an illuminance value; and
a threshold value generating unit configured to generate a threshold value for a luminance level, wherein
the luminance integrating unit integrates a luminance value discriminated through comparison with the threshold value generated by the threshold value generating unit of the luminance values detected in the image sensor.

2. The solid-state imaging device according to claim 1, further comprising a luminance value average calculating unit configured to calculate an average of the luminance values detected in the image sensor, wherein
the threshold value generating unit generates the threshold value based on an average value calculated by the luminance value average calculating unit.

3. The solid-state imaging device according to claim 2, wherein the threshold value generating unit generates at least one of an upper threshold value and a lower threshold value, which are the threshold value, through a calculation using the average value.

4. The solid-state imaging device according to claim 3, wherein the lower threshold value is a value higher than the average value.

5. The solid-state imaging device according to claim 1, further comprising a luminance ranking unit configured to give a rank by an order of the luminance level to the luminance value detected in the image sensor, wherein
the threshold value generating unit generates the threshold value based on the rank given in the luminance ranking unit.

6. The solid-state imaging device according to claim 5, wherein
the threshold value generating unit generates an upper threshold value and a lower threshold value, which are the threshold value,
the upper threshold value is the luminance value given a first set rank for the rank, and
the lower threshold value is the luminance value given a second set rank lower than the first set rank for the rank.

7. The solid-state imaging device according to claim 1, wherein the threshold value generating unit adjusts a level of the threshold value according to a brightness of the entire imaging screen.

8. The solid-state imaging device according to claim 1, further comprising a frame memory configured to store the luminance value, wherein
the luminance integrating unit integrates the luminance value read out from the frame memory.

9. The solid-state imaging device according to claim 1, further comprising an integrating target region selecting unit configured to select an integrating target region to be a target of integrating the luminance value in the luminance integrating unit of a plurality of regions set in the imaging screen.

10. The solid-state imaging device according to claim 9, further comprising a region dividing unit configured to divide the imaging screen into a plurality of regions, and having the luminance value detected in the image sensor as data for every region.

11. The solid-state imaging device according to claim 9, further comprising a threshold value generating unit configured to generate a threshold value for the luminance level for every region, wherein
with respect to a region selected as an integrating target region in the integrating target region selecting unit, the luminance integrating unit compares the luminance value and the threshold value obtained for the integrating target region and integrates the discriminated luminance value.

12. The solid-state imaging device according to claim 9, further comprising:
a luminance value average calculating unit configured to calculate an average of the luminance value for every region; and
a threshold value generating unit configured to generate a threshold value for a luminance level for every region based on an average value calculated in the luminance value average calculating unit.

13. The solid-state imaging device according to claim 9, further comprising a threshold value generating unit configured to generate a threshold value for the luminance level for every region, wherein
the integrating target region selecting unit selects the integrating target region based on a result of counting number of data of the luminance value determined as within a range of the threshold value in the luminance integrating unit for every region.

14. The solid-state imaging device according to claim 1, further comprising an exposure control unit configured to adjust exposure in an imaging of the subject image, wherein
the exposure control unit adjusts the exposure according to the luminance observation value from the luminance observation value calculating unit.

15. The solid-state imaging device according to claim 1, wherein
the image sensor includes each color light pixel configured to detect each color light in a divided manner,
the each color light pixel includes a green pixel configured to detect a green light, and
the luminance integrating unit discriminates and integrates the luminance value of the green light detected in the green pixel.

16. The solid-state imaging device according to claim 1, wherein
the image sensor includes each color light pixel configured to detect each color light in a divided manner,
the each color light pixel includes a white pixel configured to detect a white light, and
the luminance integrating unit discriminates and integrates the luminance value of the white light detected in the white pixel.

17. A camera module comprising:
a lens module configured to retrieve light from a subject;
an image sensor configured to pick up a subject image formed by the lens module;
a luminance integrating unit configured to integrate a luminance value detected for every pixel in the image sensor;
a luminance observation value calculating unit configured to calculate a luminance observation value, which is an observation result of a luminance for an entire imaging screen, based on an integration result of the luminance integrating unit;
an illuminance value conversion unit configured to convert the luminance observation value from the luminance observation value calculating unit to an illuminance value and
a threshold value generating unit configured to generate a threshold value for a luminance level, wherein
the luminance integrating unit integrates a luminance value discriminated through comparison with the threshold value generated by the threshold value generating unit of the luminance values detected in the image sensor.

18. The camera module according to claim 17, further comprising an exposure control unit configured to adjust exposure in an imaging of the subject image, wherein
the exposure control unit adjusts the exposure according to the luminance observation value from the luminance observation value calculating unit.

19. An illuminance detection method comprising:
imaging a subject image with an image sensor;
integrating a luminance value detected for every pixel in the image sensor;
calculating a luminance observation value, which is an observation result of a luminance for an entire imaging screen, based on an integration result for the luminance value;
converting the luminance observation value to an illuminance value; and
generating a threshold value for a luminance level, wherein
a luminance value discriminated through comparison with the threshold value of the detected luminance values is integrated.

* * * * *